(12) United States Patent
Niu et al.

(10) Patent No.: US 10,962,189 B2
(45) Date of Patent: Mar. 30, 2021

(54) MATRIX LIGHTING DEVICE FOR VEHICLE

(71) Applicant: HASCO VISION TECHNOLOGY CO., LTD., Shanghai (CN)

(72) Inventors: Lei Niu, Shanghai (CN); Juejing Yang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/958,707

(22) PCT Filed: Apr. 2, 2019

(86) PCT No.: PCT/CN2019/080973
§ 371 (c)(1),
(2) Date: Jun. 28, 2020

(87) PCT Pub. No.: WO2019/205900
PCT Pub. Date: Oct. 31, 2019

(65) Prior Publication Data
US 2021/0041075 A1   Feb. 11, 2021

(30) Foreign Application Priority Data

Apr. 25, 2018 (CN) .......................... 201810376607.8
Apr. 25, 2018 (CN) .......................... 201820595749.9

(51) Int. Cl.
*G02B 27/00* (2006.01)
*F21S 41/25* (2018.01)
(Continued)

(52) U.S. Cl.
CPC ............. *F21S 41/25* (2018.01); *F21S 41/285* (2018.01); *F21S 41/40* (2018.01); *G02B 3/08* (2013.01); *F21Y 2105/10* (2016.08)

(58) Field of Classification Search
None
See application file for complete search history.

(56) References Cited

U.S. PATENT DOCUMENTS 6,513,953 B1 * 2/2003 Itoh ...................... G02B 3/0062
348/E9.027
2004/0233541 A1 * 11/2004 Mori .................... G03B 21/625
359/626

(Continued)

FOREIGN PATENT DOCUMENTS

CN   102023325 A   4/2011
CN   103807714 A   5/2014
(Continued)

*Primary Examiner* — Elmito Breval

(57) ABSTRACT

The present disclosure provides a matrix lighting device for a vehicle, including a light source module, a projection lens, a projection emergent space, and a projection image plane arranged successively along an optical axis direction; the light source module comprises a light source array unit, a light shield array unit and a light receiving lens array unit arranged successively along the optical axis direction; the light source array unit includes a plurality of light sources which are independently controlled and arranged in a matrix; the light shield array unit includes a plurality of light shields arranged in a matrix and disposed outside each light source; the light receiving lens array unit includes a plurality of light receiving lenses arranged in a matrix and disposed opposite to each light source along the optical axis direction.

12 Claims, 6 Drawing Sheets

(51) Int. Cl.
*F21S 41/20* (2018.01)
*F21S 41/40* (2018.01)
*G02B 3/08* (2006.01)
*F21Y 105/10* (2016.01)

(56) References Cited

U.S. PATENT DOCUMENTS

2006/0176450 A1\* 8/2006 Akiyama ............... G03B 33/12
    353/20
2018/0180243 A1\* 6/2018 Na ........................ F21S 41/689

FOREIGN PATENT DOCUMENTS

| CN | 107101154 A | 8/2017 |
| CN | 108561846 A | 9/2018 |
| CN | 208107962 U | 11/2018 |

\* cited by examiner

MATRIX LIGHTING DEVICE FOR VEHICLE

CROSS REFERENCE TO RELATED APPLICATION

This is a Sect. 371 National Stage of PCT International Application No. PCT/CN2019/080973, filed on 2 Apr. 2019, which claims priority of a Chinese Patent Application No. 2018103766078 filed on 25 Apr. 2018 and a Chinese Patent Application No. 2018205957499 filed on 25 Apr. 2018, the contents of the three applications hereby being incorporated by reference in their entireties for all purposes.

BACKGROUND OF THE PRESENT DISCLOSURE

Field of Disclosure

The present disclosure relates to the field of vehicle lamp, particularly to a matrix lighting device for a vehicle.

Description of Related Arts

Most drivers will turn on headlights to illuminate vehicles at night. However, headlights will cause dangerous dazzling to other participants on the road (such as vehicles moving in the opposite direction, vehicles moving in the same direction, etc.), which will easily lead to traffic accidents, thus reducing the safety of all parties driving on the road at night.

With the increasingly prominent problem of safety of vehicle driving at night, more and more automobile manufacturers are developing new intelligent vehicle lamp technology. The so-called new intelligent vehicle lamp technology is mainly to develop light-type variable vehicle lamp for the purpose of achieving Adaptive Front-lighting System (AFS) and Adaptive Driving Beam (ADB) module function. For example, the system of the headlamp with ADB module function, together with the vehicle detection system, can adjust the lighting area and brightness intelligently in real time by independent control of each LED constituting the headlamp of the vehicle, when other participants on the road are found to be in a certain section of headlamp lighting, so as to avoid dangerous dazzling to the illuminated people, and continue to maintain high-brightness lighting in space without other participants on the road. However, in the headlamp of ADB module function involved in the traditional technology, the distance of the LEDs constituting the light source module is very far, resulting in the huge structure and heavy weight of the headlamp.

SUMMARY OF THE PRESENT DISCLOSURE

The present disclosure provides a matrix lighting device for a vehicle, which can realize variable light type and miniaturization of volume at the same time.

The present disclosure provides a matrix lighting device for a vehicle, including a light source module, a projection lens, a projection emergent space, and a projection image plane arranged successively along an optical axis direction; the light source module comprises a light source array unit, a light shield array unit and a light receiving lens array unit arranged successively along the optical axis direction; the light source array unit includes a plurality of light sources which are independently controlled and arranged in a matrix; the light shield array unit includes a plurality of light shields arranged in a matrix and disposed outside each light source; the light receiving lens array unit includes a plurality of light receiving lenses arranged in a matrix and disposed opposite to each light source along the optical axis direction; a light emitted by the light source in the light source array unit successively passes through the light receiving lens, the projection lens and the projection emergent space along the optical axis direction, and forms a matrix light distribution on the projection image plane.

Further, the projection lens comprises a first lens and a second lens arranged successively along the optical axis direction, and a refractive index and a dispersion coefficient of the first lens and the second lens are all different.

Preferably, a material of the first lens and the second lens includes PMMA, PC, or glass.

Further, the light source comprises a semiconductor light source, or comprises a semiconductor laser and an optical conversion element, or comprises a solid-state laser and the optical conversion element.

Preferably, the light receiving lens includes a Fresnel lens.

Further, the light shield array unit and the light receiving lens array unit are molded or injection molded into one piece.

Preferably, a material of the light receiving lens array unit includes silicone, PC, PMMA, or glass.

Preferably, the light shield array unit is made of a non-transparent material.

Preferably, the light shield array unit comprises a base body made of a transparent material and a light blocking layer made of black paint sprayed on a surface of the base body.

As stated above, the matrix lighting device for a vehicle of the present disclosure has the following beneficial effects:

In the present disclosure, independent control of multiple light sources in the light source module can avoid dangerous dazzling to other participants on the road and ensure the safety of driving at night for all parties on the road; in particular, the independently controlled multiple light sources in the present disclosure are arranged in a matrix in combination with the light shield and light receiving lens arranged in a matrix, which can achieve better light emergent effect, and effectively reduce the size of the light source module, thus minimizing the overall size of the matrix lighting device for a vehicle.

DESCRIPTION OF COMPONENT MARK NUMBERS

Figure 1:
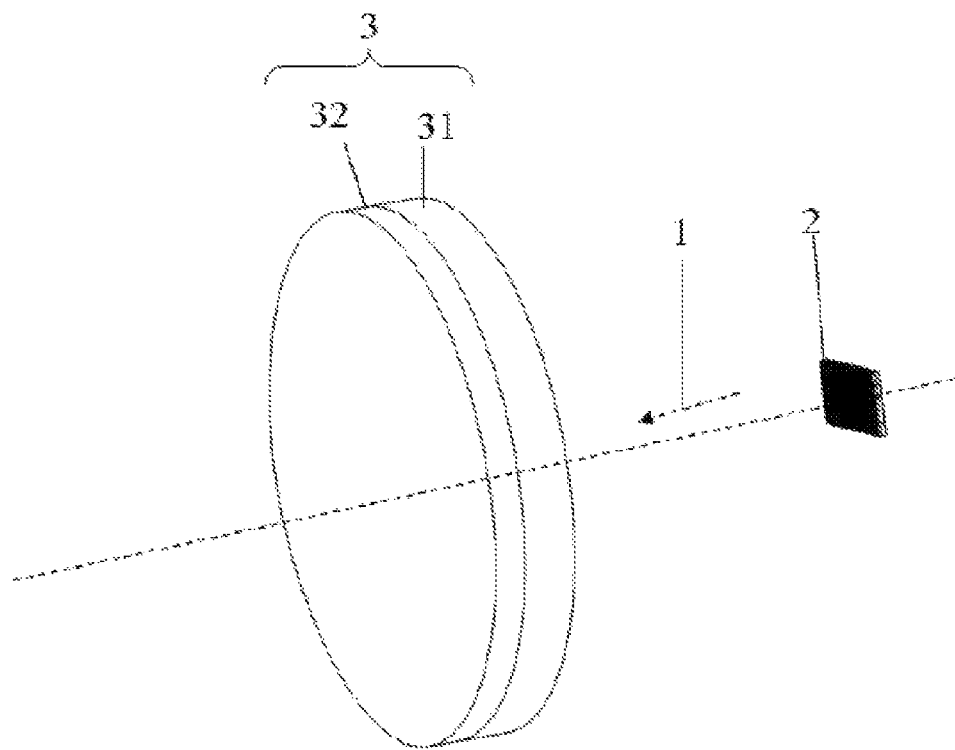
FIG. 1 is a schematic structural diagram of the matrix lighting device for a vehicle in the present disclosure.

1 Optical axis direction
2 Light source module
21 Light source array unit
211 Light source
22 Light shield array unit
221 Light shield
23 Light receiving lens array unit
231 Light receiving lens
3 Projection lens
31 First lens
32 Second lens
4 Projection emergent space
5 Projection image plane
6 Matrix optical distribution

DETAILED DESCRIPTION OF THE PREFERRED EMBODIMENTS

The implementation mode of the present disclosure will be described below through specific embodiments. Those skilled in the art can easily understand other advantages and effects of the present disclosure according to contents disclosed by the specification.

It should be noted that the structures, proportions, sizes, etc. illustrated in the drawings attached to this specification are only used to match the contents disclosed in the specification so that those skilled in the art can understand and read them. They are not used to limit the conditions under which the disclosure can be implemented. Therefore, they are not of technical significance, and any modifications of the structure, changes of the proportional relation or adjustments of size shall remain within the scope of the technical content disclosed by the present disclosure, without affecting the efficacy and purpose achieved by the present disclosure. At the same time, the terms such as "up", "down", "left", "right", "middle" and "one" quoted in this specification are only for the convenience of clear description, not for the purpose of limiting the enforceable scope of implementation of the present disclosure, and the change or adjustment of its relative relationship shall also be regarded as being within the enforceable scope of the present disclosure without substantial changes in the technical content.

For ease of description, in the following embodiments, the optical axis direction 1 is defined as a forward direction, so in FIG. 2, the left side of the paper surface is the forward direction.

Figure 2:
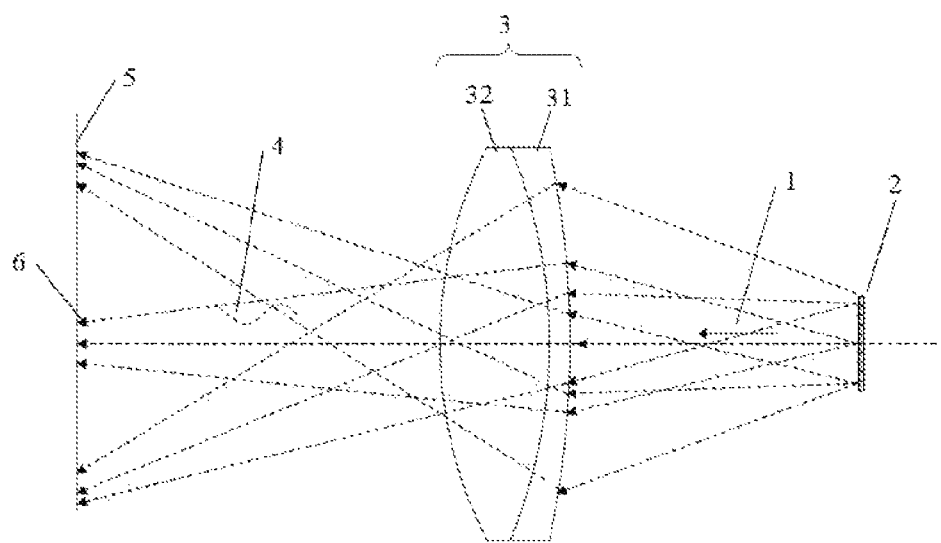
FIG. 2 is an optical principle diagram of the matrix lighting device for a vehicle in the present disclosure.
Figure 3:
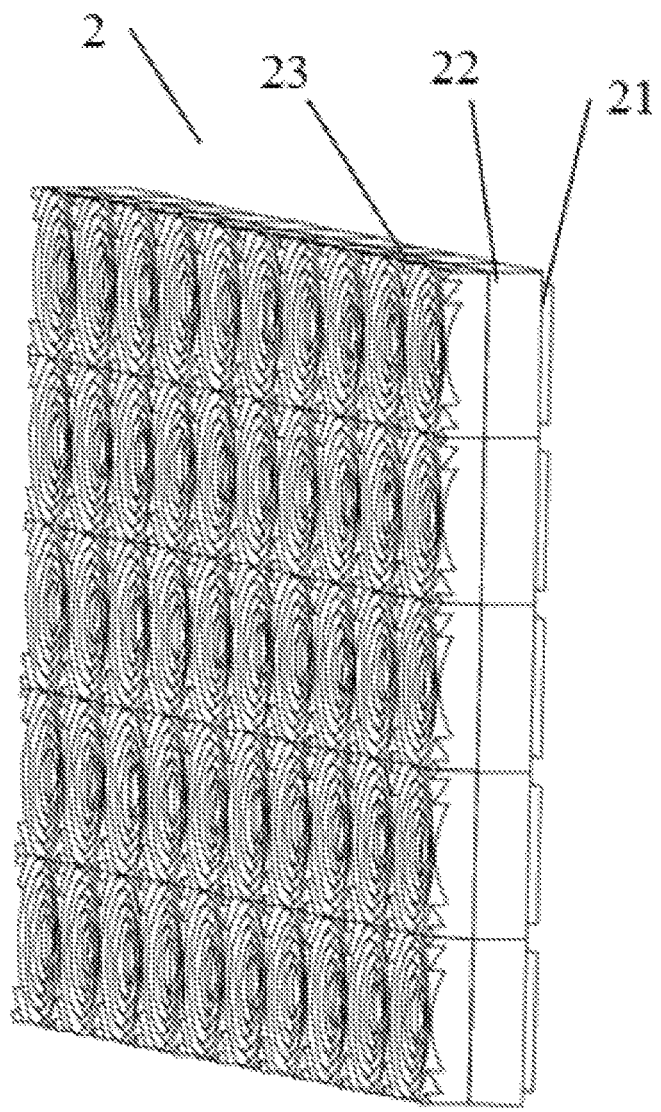
FIG. 3 is a schematic structural diagram of the first embodiment of the light source module in the present disclosure.
Figure 4:
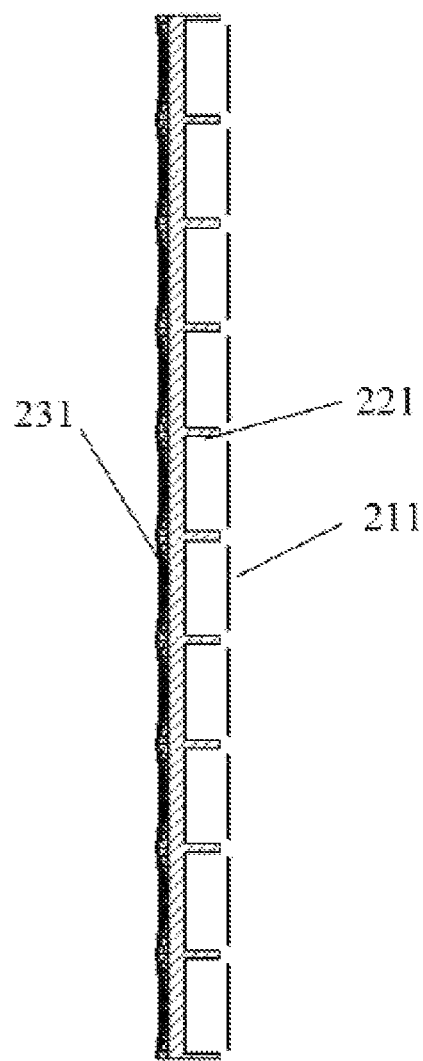
FIG. 4 is a sectional view of FIG. 3.
Figure 6:
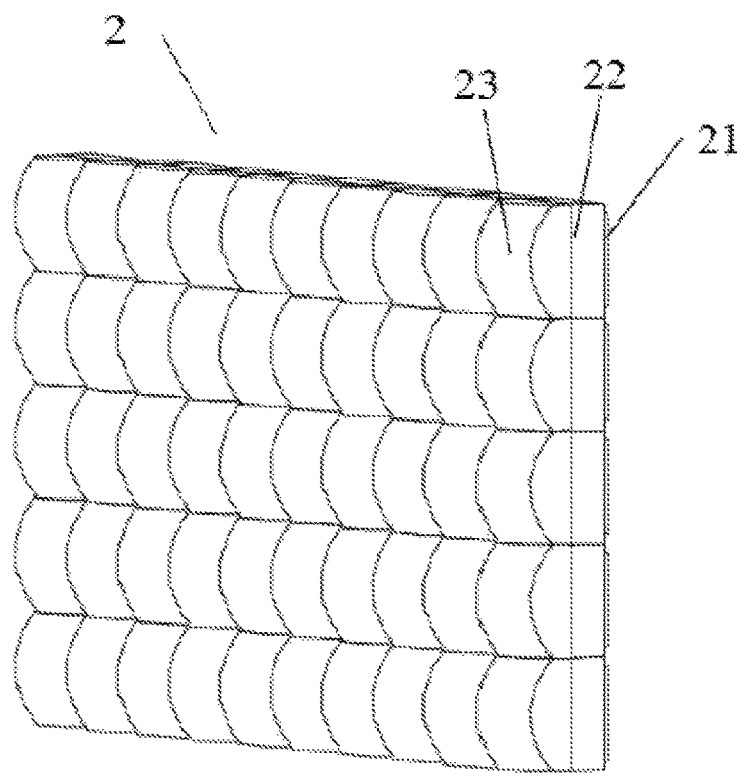
FIG. 6 is a schematic structural diagram of the second embodiment of the light source module in the present disclosure.
Figure 7:
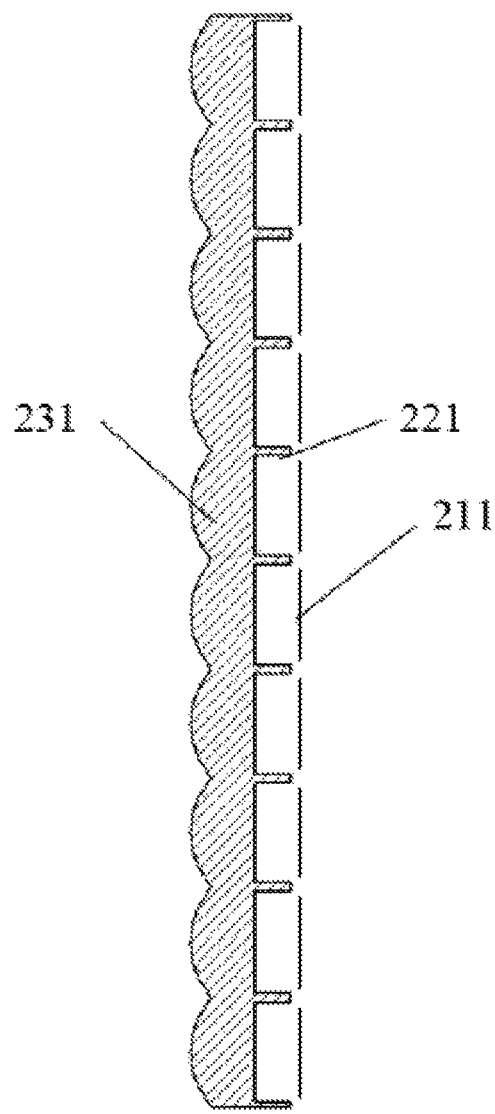
FIG. 7 is a sectional view of FIG. 6.

As shown in FIGS. 1 and 2, the present disclosure provides a matrix lighting device for a vehicle, including a light source module 2, a projection lens 3, a projection emergent space 4, and a projection image plane 5 of the system at a certain distance arranged successively along an optical axis direction 1; as shown in FIGS. 3 and 4, or in FIGS. 6 and 7, the light source module 2 includes a light source array unit 21, a light shield array unit 22 and a light receiving lens array unit 23 arranged successively along the optical axis direction 1; the light source array unit 21 includes a plurality of light sources 211 independently controlling the brightness and arranged in a matrix; the light shield array unit 22 includes a plurality of light shields 221 arranged in a matrix and disposed outside each light source 211; the light receiving lens array unit 23 includes a plurality of light receiving lenses 231 arranged in a matrix and disposed opposite to each light source 211 along the optical axis direction 1, that is, a receiving lens 231 is arranged in front of each light source 211.

Figure 8:
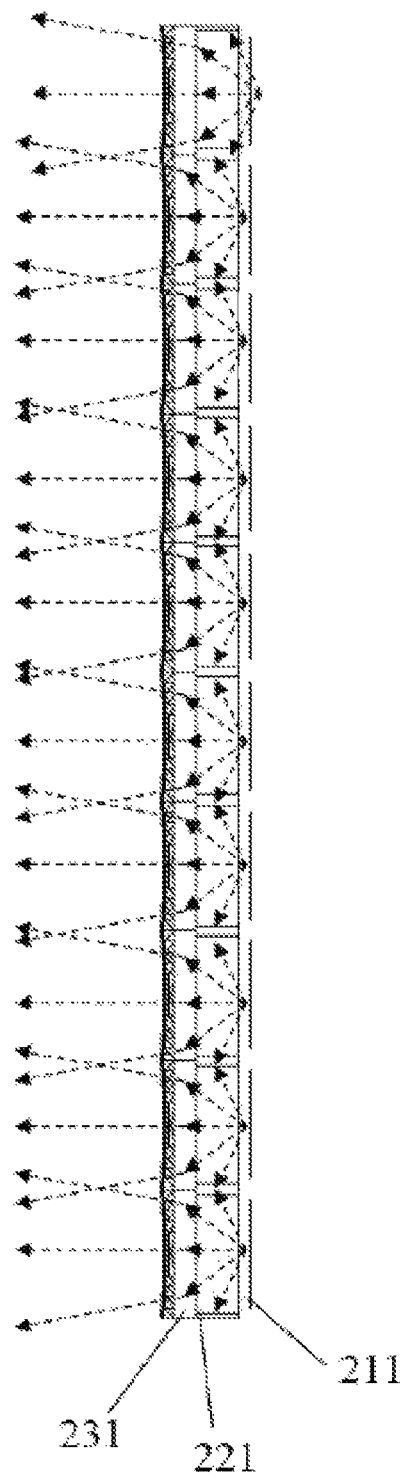
FIG. 8 is an optical principle diagram of the light source module in the present disclosure.

In the matrix lighting device for a vehicle described above, the light source module 2 emits light, that is, as shown in FIG. 8, the light source 211 in the light source array unit 21 emits light (generally divergent light beam). Most of the light beam emitted is collected and refracted by the light receiving lens 231 which is disposed opposite to the light source 211 in the light receiving lens array unit 23. After changing the angle and aperture, the light beam continue to spread along the optical axis direction 1. In the light source array unit 21, the light beam with a large angle emitted by each light source 211 is occluded by the light shield 221 located outside the light source 211. Therefore, the light beam with the large angle will not continue to spread along the optical axis direction 1 and thus not interfering with the light beam emitted by other light sources 211 in the light source array unit 21.

The light emitted by the system through the lighting module spreads along the optical axis direction 1. After refraction of the projection lens 3, the desired light distribution is achieved in the projection emergent space 4. Finally, the matrix light distribution 6 of the lighting module is uniformly reflected on the projection image plane 5 of a certain distance, and the array-type pixel lighting is realized. When the vehicle detection system detects that other participants on the road are in a certain pixel range of the matrix lighting device for a vehicle, the system realizes the brightness modulation of multi-beam light in the projection emergent space 4 by controlling the plurality of light sources 211 independently controlling the brightness, thus adjusting the matrix light distribution 6 formed on the projection image plane 5 to effectively avoid dangerous dazzling to other participants on the road. When the vehicle detection system detects that there are no other participants on the road, the system maintains the high brightness lighting of the matrix lighting device for a vehicle.

Therefore, the matrix lighting device for a vehicle in the present disclosure is a matrix adaptive headlamp of a vehicle. Through independent control of multiple light sources 211, a matrix light distribution 6 of various forms can be formed on the projected image plane 5, which will not dazzle other participants on the road. With the support of this technology, it not only ensures the high quality lighting in front of us (with matrix adaptive headlights), but also does not cause dangerous dazzling to other participants on the road (such as vehicles moving in the opposite direction, vehicles in the same direction, etc.), guaranteeing the safety of night driving of all parties on the road. In particular, the independently controlled multiple light sources 211 in the present disclosure are arranged in a matrix in combination with the light shield 221 and light receiving lens 231 arranged in a matrix, which can achieve better light emergent effect, and effectively reduce the size of the light source module 2, thus minimizing the overall size of the matrix lighting device for a vehicle.

As shown in FIG. 1, the projection lens 3 includes the first lens 31 and the second lens 32 arranged successively along the optical axis direction 1. The refractive index and the dispersion coefficient of the first lens 31 and the second lens 32 are all different; the material of the first lens 31 and the second lens 32 includes plastic such as PMMA, PC, and may also include glass. The light beam emitted by the light source module 2 is a broad spectrum beam composed of different wavelength spectra. When the first lens 31 and the second lens 32 with different refractive index and dispersion coefficient are used together, the wide spectrum beam emitted by the light source module 2 can be prevented from forming a blurred projection effect of color separation after passing through the projection lens 3 to achieve an achromatic effect. The first lens 31 and the second lens 32 may be injection molded for two materials, or cemented, or may be double separation lenses.

Figure 5:
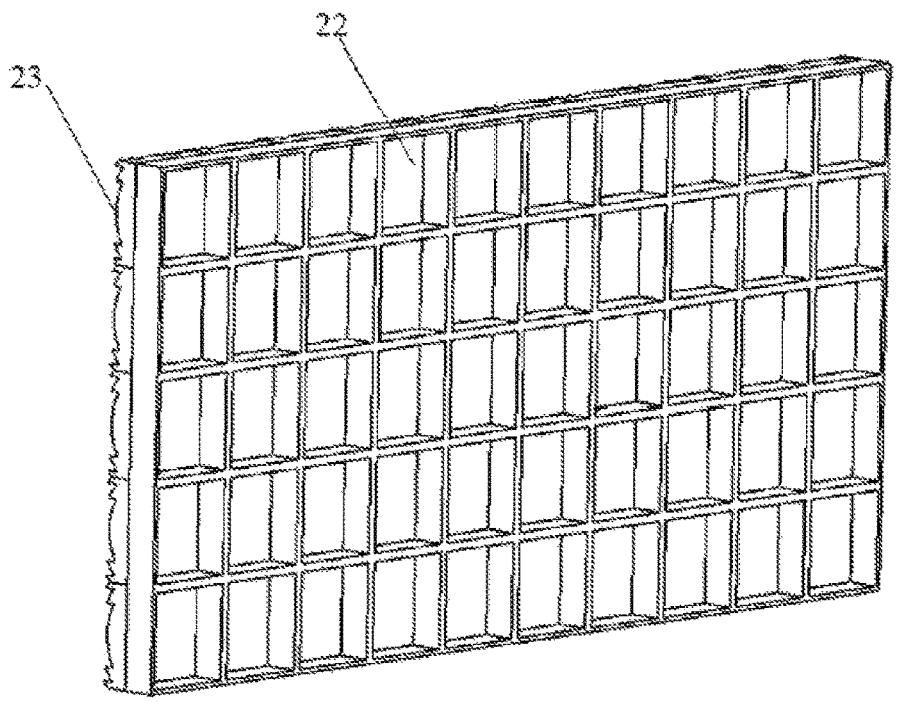
FIG. 5 is a schematic connection diagram of the light shield array unit and the light receiving lens array unit from another angle of view in FIG. 3.

As shown in FIG. 4 or 8, in the light source module 2 mentioned above, each light source 211 independently controlling brightness in the light source array unit 21, each light shield 221 independently located outside the light source 211 in the light shield array unit 22, and each light receiving lens 231 independently located in front of the light source 211 in the light receiving lens array unit 23 correspond to each other. As shown in FIG. 5, each light shield 221 is preferred to be a frame structure, so each light shield 221 includes four ribs, and two adjacent light shields 221 share one rib. The light source 211 has various types: it may be a semiconductor light source, or a light source including a semiconductor laser and an optical conversion element, or a light source including a solid-state laser and an optical conversion element, the optical conversion element may be made of an optical conversion material.

The light shield array unit 22 formed by multiple light shields 221 arranged in a matrix is an integral part. The light shield array unit 22 may be made of a non-transparent material, or includes a base body made of a transparent material and a light blocking layer made of black paint sprayed on the surface of the base body, that is, the light shield array unit 22 is made of transparent material and then sprayed with black paint. The light receiving lens 231 can be fixed by an additional bracket or directly fixed to the light shield array unit 22. When the light receiving lens 231 is fixed to the light shield array unit 22, the light receiving lens 231 may be integrated with the light shield array unit 22. For example, as shown in FIG. 3 or 6, the light shield array unit 22 and the light receiving lens array unit 23 are molded or injection molded into one piece, further reducing the volume of the matrix lighting device for a vehicle. Of course, the light shield array unit 22 and the light receiving lens array unit 23 may also be two independent parts.

The light source module 2 has two preferred embodiments.

Embodiment 1

As shown in FIGS. 3 to 5, the selected light receiving lens 231 is a Fresnel lens, which can further reduce the space, weight and cost of the light source module 2.

Embodiment 2

As shown in FIGS. 6 and 7, the selected receiving lens 231 is a conventional lens.

In the two embodiments of the light source module 2, the material of the light receiving lens array unit 23 may be a transparent material such as silicone, PC, PMMA, glass, etc. The surface of the light receiving lens array unit 23 may be a smooth mirror or a rough structural surface.

In conclusion, the matrix lighting device for a vehicle of the present disclosure has the following beneficial effects:

1. A matrix light distribution 6 can be obtained on the projection image plane 5 to realize array pixel lighting.

2. By independently controlling the brightness of the light source 211 arranged in a matrix, the brightness modulation of multi-beam light in the projection emergent space 4 can be realized, thus achieving the ability of multi-target occlusion processing.

3. Multiple light sources 211, multiple light shields 221 and multiple light receiving lenses 231 are all arranged in a matrix, which can reduce the volume of the light source module 2 and improve the energy utilization ratio of the light source.

4. The structure is simple, omitting the optical shaping structure such as a light guiding rod, reducing the volume of the optical system of the array-type pixel lighting scheme, and reducing the processing cost and assembly difficulty.

5. The stray light shielding structure, that is, the light shield array unit 22, is set up, so that the light emitted by multiple light sources 211 in the light source array unit 21 do not interfere with each other and the light distribution is uniform.

6. The achromatic structure composed of the first lens 31 and the second lens 32 with different refractive index and dispersion coefficient can effectively avoid the phenomenon of uneven and unclear color on the projection surface.

Therefore, the present disclosure effectively overcomes various shortcomings in the traditional technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A matrix lighting device for a vehicle, comprising a light source module (2), a projection lens (3), a projection emergent space (4), and a projection image plane (5) arranged successively along an optical axis direction (1), wherein
   the light source module (2) comprises a light source array unit (21), a light shield array unit (22) and a light receiving lens array unit (23) arranged successively along the optical axis direction (1), wherein
   the light source array unit (21) includes a plurality of light sources (211) which are independently controlled and arranged in a matrix,
   the light shield array unit (22) includes a plurality of light shields (221) arranged in a matrix and disposed outside each light source (211),
   the light receiving lens array unit (23) includes a plurality of light receiving lenses (231) arranged in a matrix and disposed opposite to each light source (211) along the optical axis direction (1);
   a light emitted by the light source (211) in the light source array unit (21) successively passes through the light receiving lens (231), the projection lens (3) and the projection emergent space (4) along the optical axis direction (1), and forms a matrix light distribution (6) on the projection image plane (5).

2. The matrix lighting device for a vehicle according to claim 1, wherein the projection lens (3) comprises a first lens (31) and a second lens (32) arranged successively along the optical axis direction (1), and a refractive index and a dispersion coefficient of the first lens (31) and the second lens (32) are all different.

3. The matrix lighting device for a vehicle according to claim 2, wherein a material of the first lens (31) and the second lens (32) includes PMMA, PC, or glass.

4. The matrix lighting device for a vehicle according to claim 1, wherein the light source (211) comprises
 a semiconductor light source, or
 a semiconductor laser and an optical conversion element, or
 a solid-state laser and the optical conversion element.

5. The matrix lighting device for a vehicle according to claim 1, wherein the light receiving lens (231) includes a Fresnel lens.

6. The matrix lighting device for a vehicle according to claim 1, wherein the light shield array unit (22) and the light receiving lens array unit (23) are molded or injection molded into one piece.

7. The matrix lighting device for a vehicle according to claim 6, wherein a material of the light receiving lens array unit (23) includes silicone, PC, PMMA, or glass.

8. The matrix lighting device for a vehicle according to claim 6, wherein the light shield array unit (22) is made of a non-transparent material.

9. The matrix lighting device for a vehicle according to claim 6, wherein the light shield array unit (22) comprises
 a base body made of a transparent material, and
 a light blocking layer made of black paint sprayed on a surface of the base body.

10. The matrix lighting device for a vehicle according to claim 1, wherein a material of the light receiving lens array unit (23) includes silicone, PC, PMMA, or glass.

11. The matrix lighting device for a vehicle according to claim 1, wherein the light shield array unit (22) is made of a non-transparent material.

12. The matrix lighting device for a vehicle according to claim 1, wherein the light shield array unit (22) comprises
 a base body made of a transparent material, and
 a light blocking layer made of black paint sprayed on a surface of the base body.

* * * * *